350-395 SR
OR 2,982,178
SEARCH ROOM

MULTI-LAYER LIGHT POLARIZING STRUCTURE

Original Filed Nov. 14, 1952

*INVENTOR.*
ALVIN M. MARKS
BY Albert F. Kronman
ATTORNEY

United States Patent Office 2,982,178

Patented May 2, 1961

1

2,982,178

MULTI-LAYER LIGHT POLARIZING STRUCTURE

Alvin M. Marks, Whitestone, N.Y., assignor to Marks Polarized Corporation, Whitestone, N.Y., a corporation of New York Original application Nov. 14, 1952, Ser. No. 320,440, now Patent No. 2,887,566, dated May 19, 1959. Divided and this application June 15, 1956, Ser. No. 591,723

7 Claims. (Cl. 88—65)

This invention relates to a multi-layer light polarizing structure and is a divisional application of an application for patent filed November 14, 1952, by Alvin M. Marks, Serial No. 320,440, entitled, Glare Eliminating Optical System now U.S. Patent No. 2,887,566, issued May 19, 1959.

An object of the present invention is to provide a polarizing means, capable of polarizing high intensity sources of light, without overheating.

Another object of the present invention is to provide an inexpensive light polarizing means.

A further object of the present invention is to provide a chemically inert light polarizing means.

An object of the present invention is to provide a light polarizing structure which will not deteriorate in the presence of ultra-violet and infra-red light.

Another object of the present invention is to provide a non-absorptive type polarizer which conserves light by reflecting the component not transmitted.

A feature of the present invention is its multi-layer light polarizing structure.

A further feature of the present invention is its unitary construction.

The invention consists of the construction, combination and arrangement of parts, as herein illustrated, described and claimed.

In the accompanying drawings, forming a part hereof are illustrated five forms of embodiment of the invention, in which drawings similar reference characters designate corresponding parts, and in which.

In the present specification, the term plane of polarization follows the old convention which makes the plane of polarization from a light beam such, that it is coincident with the magnetic vector of the said light beam; that is, at right angles to the electric vector thereof.

The multi-layer polarizer, in contradistinction to a linear or crystal type of polarizer, which polarizes by transmitting one component and totally absorbing the remainder of the light, polarizes by reflection and refraction. This polarizer is formed of between two and twenty layers, depending on the index of refraction of

2 the layers and the percentage of polarization required. The layers are preferably made of a suitable material having a high index of refraction, hereinafter more specifically described.

The multi-layer polarizers set forth herein are quite thin and may be supported by glass plates 11, 12, comprising parallel glass plates.

Figure 1:
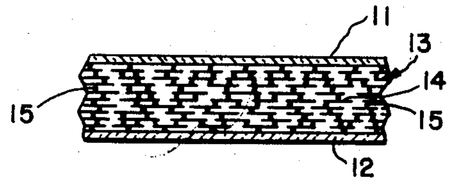
Figure 1 is a fragmentary view somewhat enlarged showing a flake type polarizer in accordance with the present invention.

Referring to Figure 1, there is shown a polarizer in which a plurality of layers 13 are formed by depositing glass flakes 14, upon a suitable support plate 12. A cover glass 11 may overlie the flakes 14. The glass flakes 14 are preferably of a thickness between 1 and 100 microns and of a flat dimension of the order of 0.10 to 1 millimeter. These flakes 14 may be suspended in an air-stream and floated downwardly in a uniform layer upon a glass plate 12, similar in effect to the uniform coating produced by a snow fall. Interspersed with the flakes 14 may be a still finer and smaller proportion of a low melting point glass 15 known commercially as solderglass (Corning Glass Works). After being deposited upon the glass plates 12, the flakes 14 are covered with a glass cover plate 11, and the entire assembly heated so as to cause a sintering or adhesion of the parts comprising the flakes 14, the solderglass 15, and the cover plates 11, 12. Because of the low melting point of the solderglass 15 the selection of a suitable amount of heat for sintering will leave a large proportion of flat air spaces between the individual plates.

Figure 2:
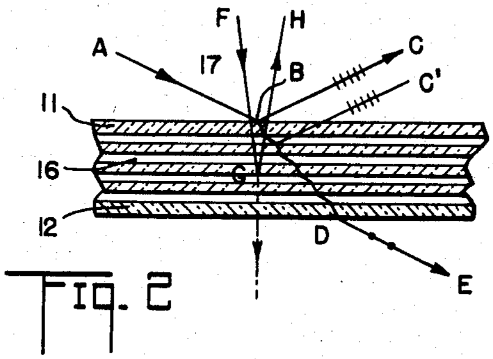
Figure 2 is a fragmentary cross-sectional view of a multi-layer polarizer showing the various paths made by the light incident thereon.

Referring now to Figure 2, there is shown a second embodiment of the present invention consisting of plates 11, 12, having therebetween a plurality of layers 16 of high index material separated by air layers or lower index layers. Rays 17 incident normally upon such a structure will be reflected and transmitted. However, by providing a sufficient number of layers the approximately normal transmission may be reduced to 10%, 5%, or 1% depending upon the number of layers, and the index of refraction of the said layers relative to the air spaces therebetween. If the incident ray A—B makes an angle of incidence equal to Brewster's angle which is given by the following formula:

$$\alpha = \text{Tan}^{-1} N$$

Where N is the index of refraction and where alpha is Brewster's angle of incidence, then the intensity of the transmitted ray D—E will constitute almost 50% of the incident ray A—B, regardless of how many layers 16 are interposed therebetween. It is assumed however, that these layers are sufficiently thin and have little or no absorptive qualities in the total thickness presented. This is actually the case for most transparent materials such as glass and transparent plastics. The ray F—G which is almost at normal incidence will be practically totally reflected as ray G—H while ray A—B is transmitted to the extent of about 50% as ray D—E without absorption at Brewster's angle. The other 50% of ray A—B is reflected as ray B—C, which is polarized in the plane of the paper, while the transmitted ray D—E is polarized in the plane normal to the plane of the paper.

As a further embodiment of the present invention, sheets of glass may be coated with certain materials having a high index of refraction for the purpose of producing a multi-layer polarizer. Such materials which may be used in this connection are as follows:

(Titanium dioxide, index 2.4)
(Zinc sulfide, index 2.4)
(Stannic oxide, index 1.8)
(Selenium, index 3.0)

Figure 3:
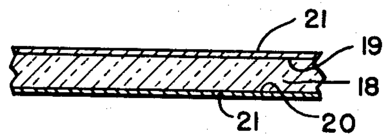
Figure 3 is a fragmentary view somewhat enlarged of a high index light polarizing structure.
Figure 4:
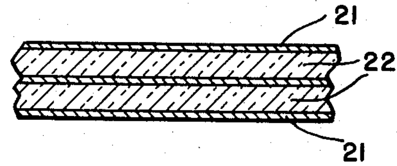
Figure 4 is a fragmentary view somewhat enlarged of a modification of the light polarizing device shown in Figure 3.

Such a polarizing structure is shown in Figure 3 in which a central transparent member 18 such as sheet plastic, cellulose acetate, polyester film or extremely thin glass ribbon is employed. The surfaces 19, 20 of the thin sheet member 18 are coated with a high index film 21 of approximately .0001" to .0005" thick of one or more of the materials set forth above. The methods of applying such materials to the glass sheet 18 are known in the prior art, and particular reference is made to Patent No. 2,478,385, issued to R. A. Gaiser. It is within the purview of the present invention to form a structure of three or more high indexlayers 21, for the purpose of producing a multi-layer polarizer as shown in Figure 4. It has been found, for example, that three layers of titanium dioxide, index 2.4, when used in spaced parallel relationship to form a multi-layer polarizer, provides highly satisfatcory results employing a structure comprising a few layers. The layers of titanium dioxide 21 shown in Figure 4, may be separated, for example, by suitable low index of transparent material such as glass sheets 22, which preferably may have an index of refraction of 1.50, or less.

Figure 5:
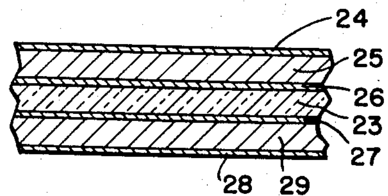
Figure 5 is a fragmentary view somewhat enlarged of a high index polarizer made in accordance with the present invention.
Figure 6:
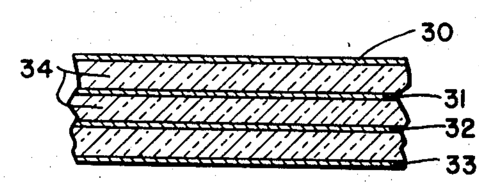
Figure 6 is a fragmentary view somewhat enlarged of another high index polarizer made in accordance with the present invention.

Referring now to Figures 5 and 6, there are shown certain novel polarizing structures which employ high index coatings, such as titanium dioxide, which has an index of 2.4 relative to air. In Figure 5 there is shown a glass plate 23, having deposited on it a number of layers such as 24, 25 and 26. The layers 24 and 26 comprise high index coatings such as titanium dioxide while the thin layers 25 between are of low index consisting of, for example, a thin silica film or a magnesium fluoride film. In like manner the other face of the glass plate 23 also contains high index film 27 and 28 with a low index film 29 interspersed therebetween. The composite structure shown in Figure 5 is capable of polarizing light to a high degree, at angles of incidence in the vicinity of 60°.

By forming a structure (not shown) similar to Figure 5, comprising three layers having high indices of refraction, and two layers between having low indices of refraction, on each face thereof, making a total number of six layers of high index of refraction, approximately ninety-eight percent of the light may be polarized in the vicinity of approximately 60° angle of incidence.

Calculation shows that the relative index of refraction between the layers 24 and 25, for example, where the indices of refraction of the individual film relative to air are 2.4 and 1.3 respectively, is 1.85. In a similar manner, the indices of refraction of the high index film 26 relative to glass 23 of index of refraction 1.5, is 1.6. It will be noted that these indices of refraction are relatively high, and correspond roughly to those ordinarily obtainable for films of the low index materials relative to air.

Referring now to Figure 6 there is shown a composite structure comprising high index film such as titanium dioxide, 30, 31, 32 and 33, which have been formed on thin sheets of micro or ribbon glass 34. These sheets are then laid together in the absence of air and pressed while heated and softened together to form a fused composite or unitary layer.

Polarizing sheets such as are shown in Figures 5 and 6 are unitary in structure and can be handled as a single piece. They can be made in large sheets and cut just as an ordinary piece of glass. The articles thus have the utility of ordinary pieces of glass while at the same time having the property of polarizing light owing to their multi-layered structure.

It has been found that it is possible to obtain effective polarization with a minimum number of layers by employing materials such that the relative index of refraction between surfaces is at least 1.5 and preferably of 2.0 or more. The use of the titanium dioxide film disclosed herewith is particularly suitable in constructing the articles shown in Figures 5 and 6. In Figure 5, for example, where the interlayer 23 may be of an index of refraction 1.3, the relative index of refraction is 1.85. In Figure 6, for example, where the interlayer 34 may comprise glass of index of refraction 1.5, the relative index of refraction is 1.6 and a high degree of polarization may be obtained with approximately 2–12 titanium dioxide films with glass in between.

The structure shown in Figures 3, 4, 5 and 6, have the further advantage that the coatings are thin, uniform, and remain flat by reason of the support upon flat glass surfaces. The structures comprising air inter-spaces have a tendency to depart from flatness and have a tendency to scatter and disperse light somewhat thus making such materials translucent. Where it is desired to transmit optical images the articles shown in Figures 3, 4, 5 and 6 are preferable. Since the films 24, 25 and 26 are extremely thin they are not likely to give rise to multiple noticeably separated reflections which would cause multiple images.

In connection with the thickness of the films 24, 25, and 26, it has been found that a thickness of approximately one-quarter wave length of yellow light to normally incident light will facilitate normal reflection for the high index film such as 24 and one-quarter wave length of yellow light for the low index film such as 25, and, owing to the increased path lengths tend to facilitate the transmission and reflection of polarized light at angles of incidence greater than normal.

The simple single glass construction shown in Figure 3, wherein titanium dioxide layers are coated upon each surface of the glass solves the practicable problem imposed by multilayer polarizers. These polarizers have heretofore been difficult to fashion, because the layers have had to be thin and numerous, yet supported in an absolute plane in order to obtain accurate reflection so as to insure the parallelism of the reflected beam. The single glass construction as taught herein provides highly useful results but it will of course be apparent that the polarizers having additional layers such as have hereinabove been set forth and are shown in Figures 4, 5 and 6, may be employed to obtain even greater polarizing ratios.

In tests made with two layers of glass covered on each side with one-quarter wave titanium dioxide coatings, a peak transmission was achieved with the angle of incidence, at 20° of 53½% and a polarizing ratio of 12 to 1. At an angle of 15° transmission dropped to 50% but the polarizing ratio increased to 17.7.

Having thus fully described the invention, what is claimed as new and desired to be secured by Letters Patent of the United States, is:

1. A panel having the property of polarizing light passing therethrough comprising, a plurality of light transmitting thin glass flakes disposed in substantially parallel orientation with respect to each other and the plane of the panel, and spaced from each other over the greater portion of their areas and having substantially flat air spaces therebetween and a quantity of transparent adhesive material interstitially carried by the panel flakes at their contact edges to secure the flakes together, said flakes and air spaces being of abruptly different index of refraction.

2. A multi-layer light polarizer comprising, a plurality of randomly disposed transparent flakes of a thickness of from 1 to 100 microns and a flat dimension of the order of 0.10 to 1 millimeters in parallel orientation, said flakes having a large area to thickness ratio, air spaces between the flakes, said flakes and air spaces having different indices of refraction and a binder incorporated therewith to bind the flakes into a unitary structure having of the order of 2 to 20 layers therein.

3. A multi-layer light polarizer comprising, a plurality of randomly disposed light transmitting flakes in parallel orientation, said flakes having a flat dimension of the order of 0.10 to 1 millimeters and a thickness of from 1 to 100 microns interspersed with air spaces, said flakes and air spaces being of different indices of refraction and a binder incorporated therewith to bind the flakes into a unitary multi-layered structure having of the order of 2 to 20 layers therein.

4. A multi-layer light polarizer comprising, a plurality of light transmitting glass flakes, said flakes having a flat dimension of the order of 0.10 to 1 millimeters and a thickness of from 1 to 100 microns disposed in the plane of the polarizer, a plurality of air spaces between the flakes, said flakes and air spaces being of different indices of refraction and a quantity of low melting point glass beads of substantially smaller size than the flakes interspersed among the flakes to hold the said flakes in spaced parallel relationship with each other, said flakes forming a multi-layered structure having of the order of 2 to 20 layers therein.

5. A multi-layer light polarizer comprising, a plurality of light transmitting glass flakes, said flakes having a flat dimension of the order of 0.10 to 1 millimeters and a thickness of from 1 to 100 microns disposed in the plane of the polarizer, a plurality of air spaces between the flakes, said flakes and air spaces being of different indices of refraction and a quantity of low melting point glass beads of substantially smaller size than the flakes interspersed among and fused to the flakes to hold the said flakes in spaced parallel relationship with each other, said flakes forming a multi-layered structure having of the order of 2 to 20 layers therein.

6. A multi-layer light polarizer comprising, a flat glass plate, a plurality of light transmitting glass flakes upon said plate, said flakes having a flat dimension of the order of 0.10 to 1 millimeters and a thickness of from 1 to 100 microns disposed in the plane of the plate, a plurality of air spaces between the flakes, said flakes and air spaces being of different indices of refraction and a quantity of low melting point glass beads of substantially smaller size than the flakes interspersed among the flakes to hold the said flakes in spaced parallel relationship with each other, said flakes forming a multi-layered structure having of the order of 2 to 20 layers therein.

7. A panel having the property of polarizing light passing therethrough comprising, a first transparent sheet, a second transparent sheet spaced from and parallel to said first sheet, a plurality of light transmitting thin glass flakes randomly aligned but in substantial parallelism with respect to each other and the plane of the panel filling the space between said sheets, substantially flat air spaces between the flakes and transparent adhesive means for securing the flakes to each other and to the sheets, said flakes and air spaces being of abruptly different index of refraction.

References Cited in the file of this patent

UNITED STATES PATENTS

| | | |
|---|---|---|
| 2,017,705 | Sproxton | Oct. 15, 1935 |
| 2,252,898 | Pollack | Aug. 19, 1941 |
| 2,402,176 | Marks | June 18, 1946 |
| 2,403,731 | MacNeille | July 9, 1946 |
| 2,453,379 | Marks | Nov. 9, 1948 |
| 2,492,809 | Marks | Dec. 27, 1949 |
| 2,693,668 | Slayter | Nov. 9, 1954 |